United States Patent
Roberts et al.

(10) Patent No.: US 9,243,866 B2
(45) Date of Patent: Jan. 26, 2016

(54) PARACLIP ADAPTER

(71) Applicant: Magpul Industries Corp., Boulder, CO (US)

(72) Inventors: Timothy Eric Roberts, Eric, CO (US); Michael T. Mayberry, Denver, CO (US)

(73) Assignee: MAGPUL INDUSTRIES CORP., Louisville, CO (US)

( * ) Notice: Subject to any disclaimer, the term of this patent is extended or adjusted under 35 U.S.C. 154(b) by 0 days.

(21) Appl. No.: 14/581,544

(22) Filed: Dec. 23, 2014

(65) Prior Publication Data

US 2015/0198412 A1 Jul. 16, 2015

Related U.S. Application Data

(60) Provisional application No. 61/926,195, filed on Jan. 10, 2014.

(51) Int. Cl.
*F41C 33/00* (2006.01)
*F16B 13/08* (2006.01)

(52) U.S. Cl.
CPC .............. *F41C 33/007* (2013.01); *F41C 33/006* (2013.01); *F16B 13/0891* (2013.01)

(58) Field of Classification Search
CPC ...... F41C 23/02; F41C 33/006; F41C 33/007; F16B 13/0891; F16B 13/065; F16B 13/001; E21D 21/008
USPC ........................................................... 42/85
See application file for complete search history.

(56) References Cited

U.S. PATENT DOCUMENTS

| 317,448 | A | * | 5/1885 | Evans | 411/53 |
|---|---|---|---|---|---|
| 1,316,640 | A | * | 9/1919 | Farsons | 411/78 |
| 1,964,427 | A | * | 6/1934 | Chandler | 411/76 |
| 1,993,749 | A | * | 3/1935 | Pleister | 411/76 |
| 2,078,010 | A | * | 4/1937 | Meepos | 42/85 |
| 2,116,618 | A | * | 5/1938 | Crockett | 42/85 |
| 2,480,662 | A | * | 8/1949 | McKinzie | 42/85 |
| 3,478,641 | A | * | 11/1969 | Dohmeier | 411/79 |
| 3,844,194 | A | * | 10/1974 | Reinwall, Jr. | 411/76 |
| 4,571,872 | A | * | 2/1986 | Johnson | 42/85 |
| 4,605,350 | A | * | 8/1986 | Chater et al. | 411/75 |
| 4,859,118 | A | * | 8/1989 | Schaeffer | 405/259.3 |
| 5,352,066 | A | * | 10/1994 | Schaeffer et al. | 405/259.6 |
| 7,654,027 | B1 | * | 2/2010 | Grover | 42/85 |
| 8,282,318 | B2 | * | 10/2012 | Robertson, Jr. | 405/259.4 |
| 8,516,732 | B2 | * | 8/2013 | Burnsed, Jr. | 42/85 |

(Continued)

OTHER PUBLICATIONS

M4Carbine, "Magpul ASAP Sling Plate", Webpage found at http://www.m4carbine.net/showthread.php?26217-Magpul-ASAP-Sling-Plate, p. 4, Published in: US.

(Continued)

*Primary Examiner* — Troy Chambers
*Assistant Examiner* — Joshua Semick
(74) *Attorney, Agent, or Firm* — Neugeboren O'Dowd PC

(57) ABSTRACT

An adapter for a QD socket is disclosed. The adapter has a connection post having a plurality of tabs movable relative to each other between a first configuration and a second configuration. The first configuration defines a maximum effective outer diameter of the connection post, and the second configuration defines a minimum effective outer diameter of the connection post. A method of modifying a quick disconnect attachment is also disclosed.

22 Claims, 13 Drawing Sheets

(56) References Cited

U.S. PATENT DOCUMENTS 8,596,701 B2 * 12/2013 Alba .............................. 294/215
8,832,985 B2 *  9/2014 Smith, III ........................ 42/85
8,832,986 B2 *  9/2014 Mayberry et al. ................ 42/85

OTHER PUBLICATIONS

"Bicycle Steerer", Webpage found at https://ccxxuq.blu.livefilestore.com/y1pU5TPO_hTuRNPBn2VTbKOHGeOCtH59hVdN2Fzly_jTf5qst2khE_tlQWJgKEH-98WQhFmlZLb_24/DSC02701. p. 1, Published in: US.
Bicycledesigner.com, "Stem for Threaded Headset", Webpage found at http://www.bicycledesigner.com/bike-parts/bicycle-stem/stem-for-threaded-headset-1.html, p. 4, Published in: US.
Youtube, "Loose AR15 Upper and Lower Fix—Demon Tactical Quick Pin", Webpage found at http://www.youtube.com/watch?v=I75YCnj3FTE , p. 3, Published in: US.
Demon Tactical, "Demon Tactical Quick Pin", Webpage found at http://www.demontactical.com/demon-tactical-quick-p-57648.html, p. 1, Published in: US.
GG&G, "AR-15/M16 Receiver End Plate Sling Mount With Enhanced Heavy Duty Quick Detach Sling Swivel", Webpage found at http://www.gggaz.com/ar-15-m16-receiver-end-plate-qd-sling-mount-with-enhanced-qd-sling-swivels.html, p. 2, Published in: US.
Bitter End Choppers, "Internal Throttle", Webpage found at http://www.bitterendchoppers.com/Misc.html , p. 3, Published in: US.
JP Enterprises, "JP Tension Pin", Webpage found at http://www.jprifles.com/1.5.1.7_small_tp.php, p. 2, Published in: US.
AR15.com, "Magpul M93 QD Plate", Webpage downloaded at http://www.ar15.com/archive/topic.html? b=3&f=12&t=242264, p. 19, Published in: US.
AR15.com, "Magpul's PRS G3", Webpage found at http://www.ar15.com/archive/topic.html?b=6&f=9&t=213719, p. 1, Published in: US.
Midway USA, "How to Combine AR-15 Upper and Lower Receivers Presented by Larry Potterfield of Midway USA", Webpage found at http://www.youtube.com/watch?v=dXbZeuBacnw, p. 1, Published in: US.
Noveske, "Noveske QD End Plate", Webpage found at http://shopnoveske.com/collections/parts/products/noveske-qd-end-plate, p. 2, Published in: US.
Bing, "QD Swivels Search", Webpage found at http://www.bing.com/images/search?q=QD+swivels&qpvt=QD+swivels&FORM=IQFRML, p. 2, Published in: US.
Peter White Cycles, "Nitto Racing Stem", Webpage found at http://www.peterwhitecycles.com/images/products/stems/nit-toracingstem1.jpg, p. 1, Published in: US.
Rammounts, "Ram Wedge Search", Webpage found at http://www.rammount.com/search?utf8=%E2%9C93&query=ram+wedge+mount&search_button=GO, p. 2, Published in: US.
Magpul Industries, Corp., "Forward Sling Mount", Webpage found at https://www.magpul.com/products/forward-sling-mount-1, p. 4, Published in: US.
Wikipedia, "Quill Stem (Bicycle Part)", Webpage found at http://en.wikipedia.org/wiki/Stem_(bicycle_part), p. 8, Published in: US.
Cheaper Than Dirt, "Troy Industries AR-15 OEM M4 Battlesling Endplate Mount with QD Swivel Aluminum Flat Dark Earth SMOU-M4S-00FT-00", Webpage found at http://www.cheaperthandirt.com/product/9-71898, 2013, p. 2, Published in: US.
American Van Equipment, "Hitch Vise Mount", Webpage found at http://www.americanvan.com/hitch-vise-mount.html, p. 2, Published in: US.

\* cited by examiner

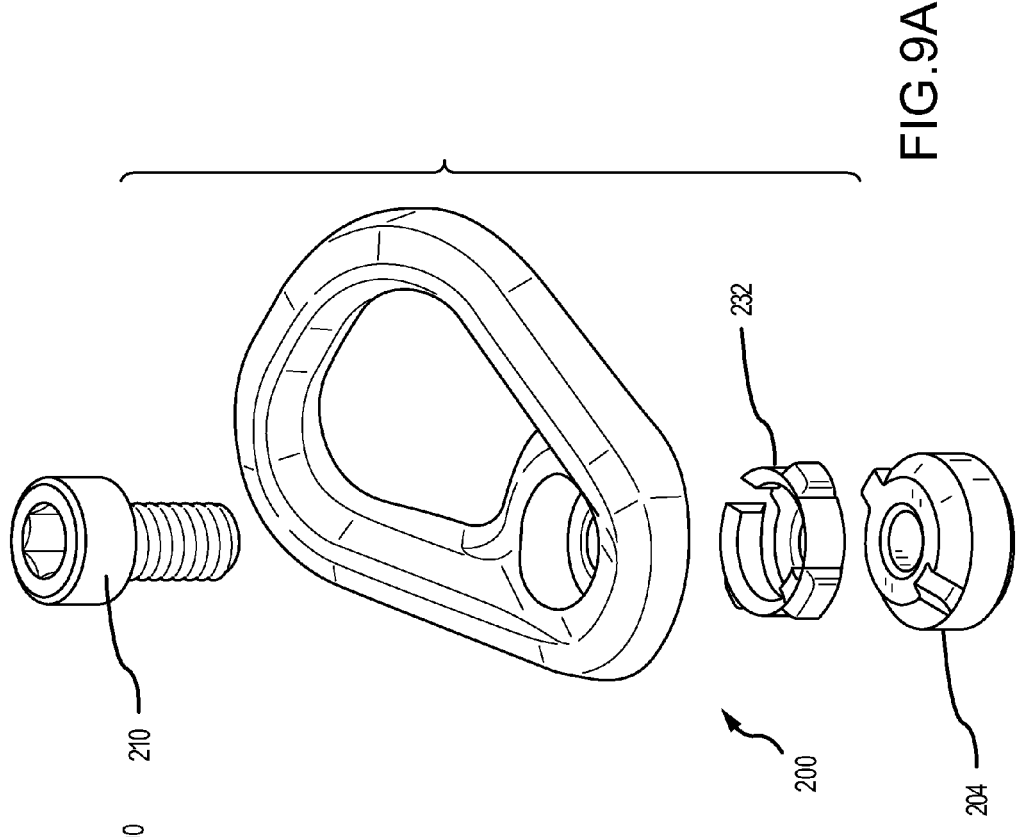
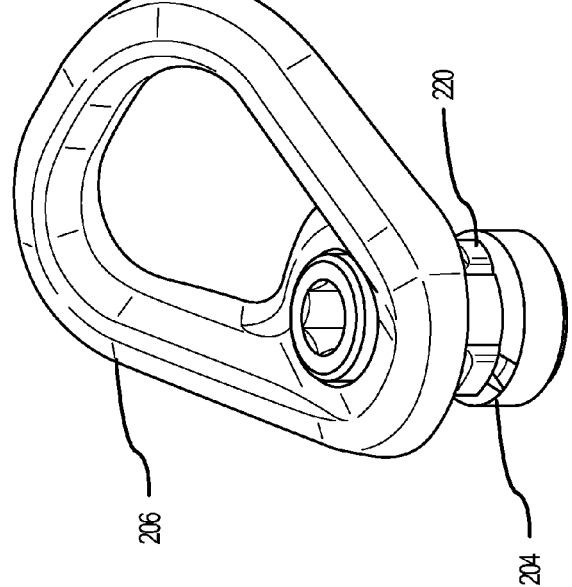
FIG. 9
FIG. 9A

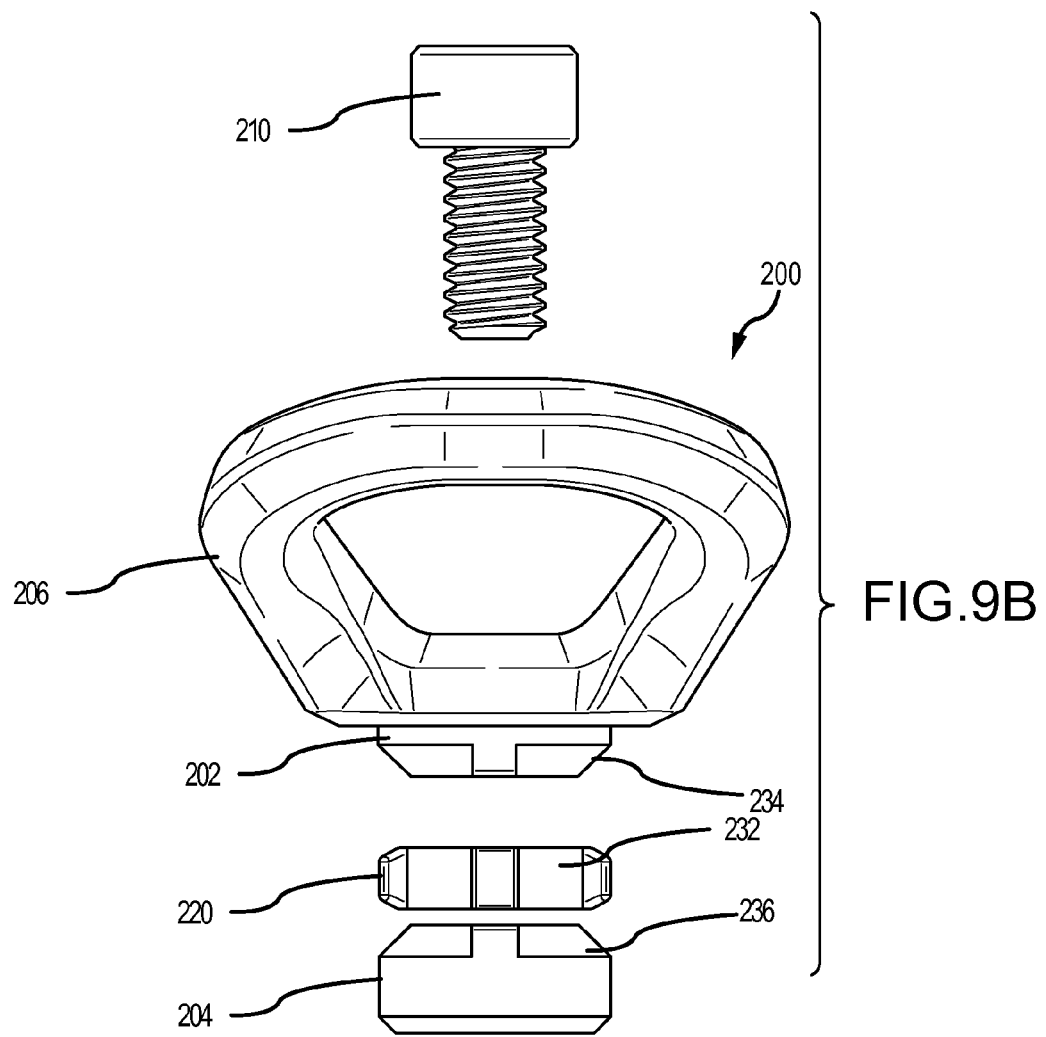

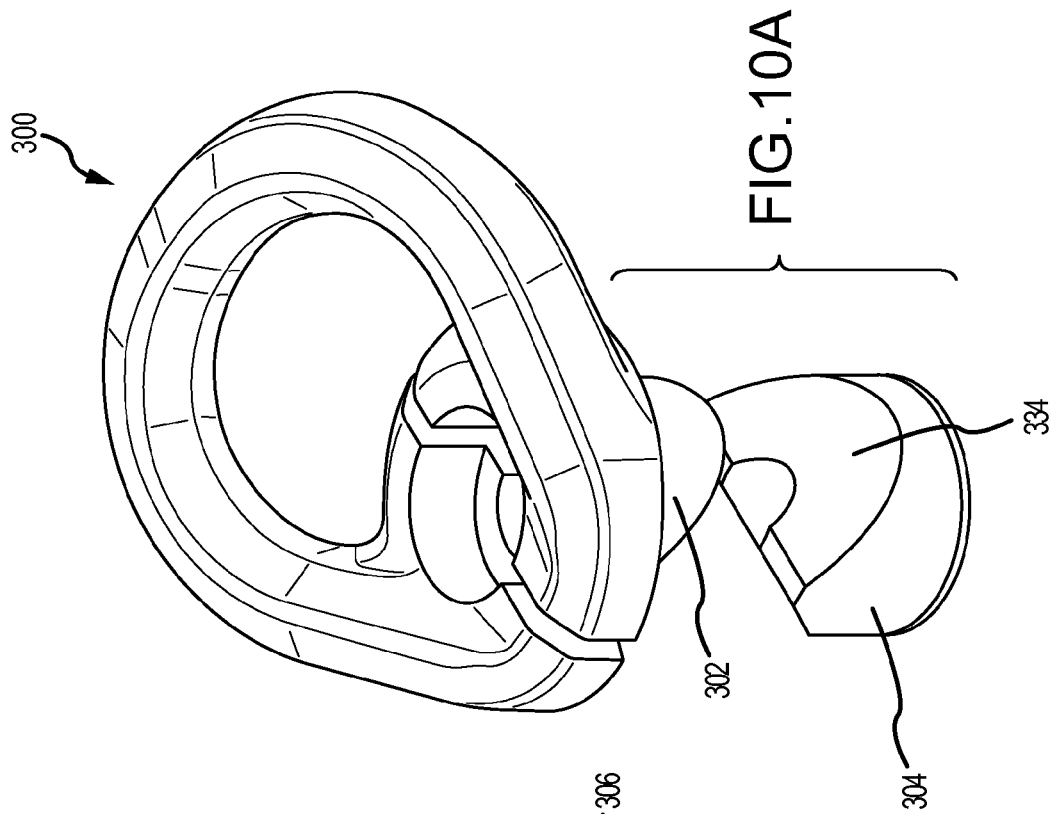
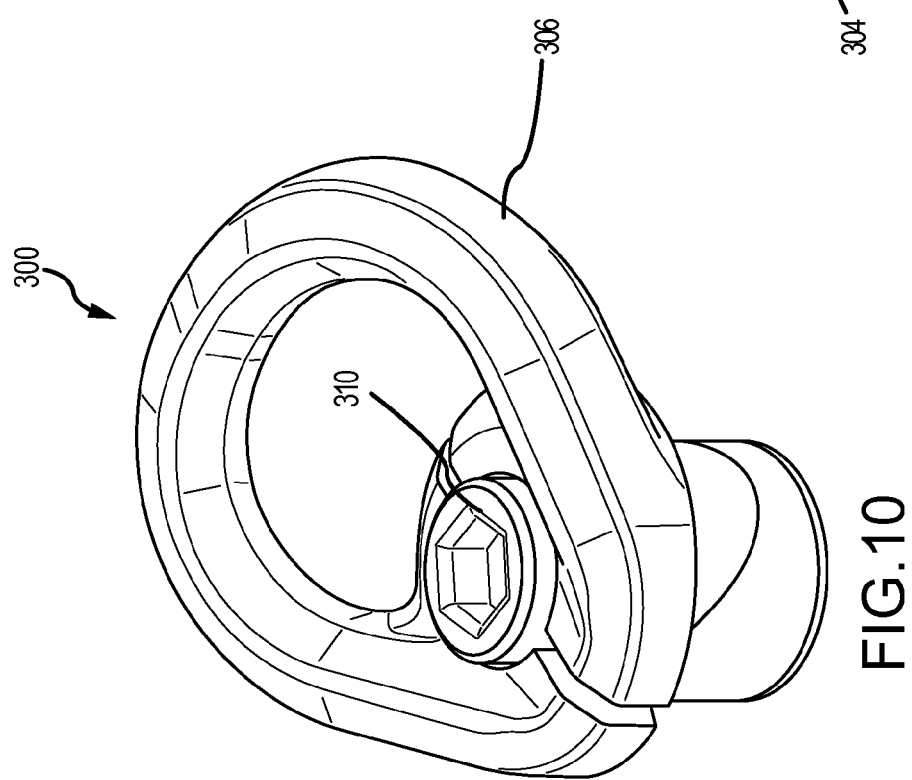

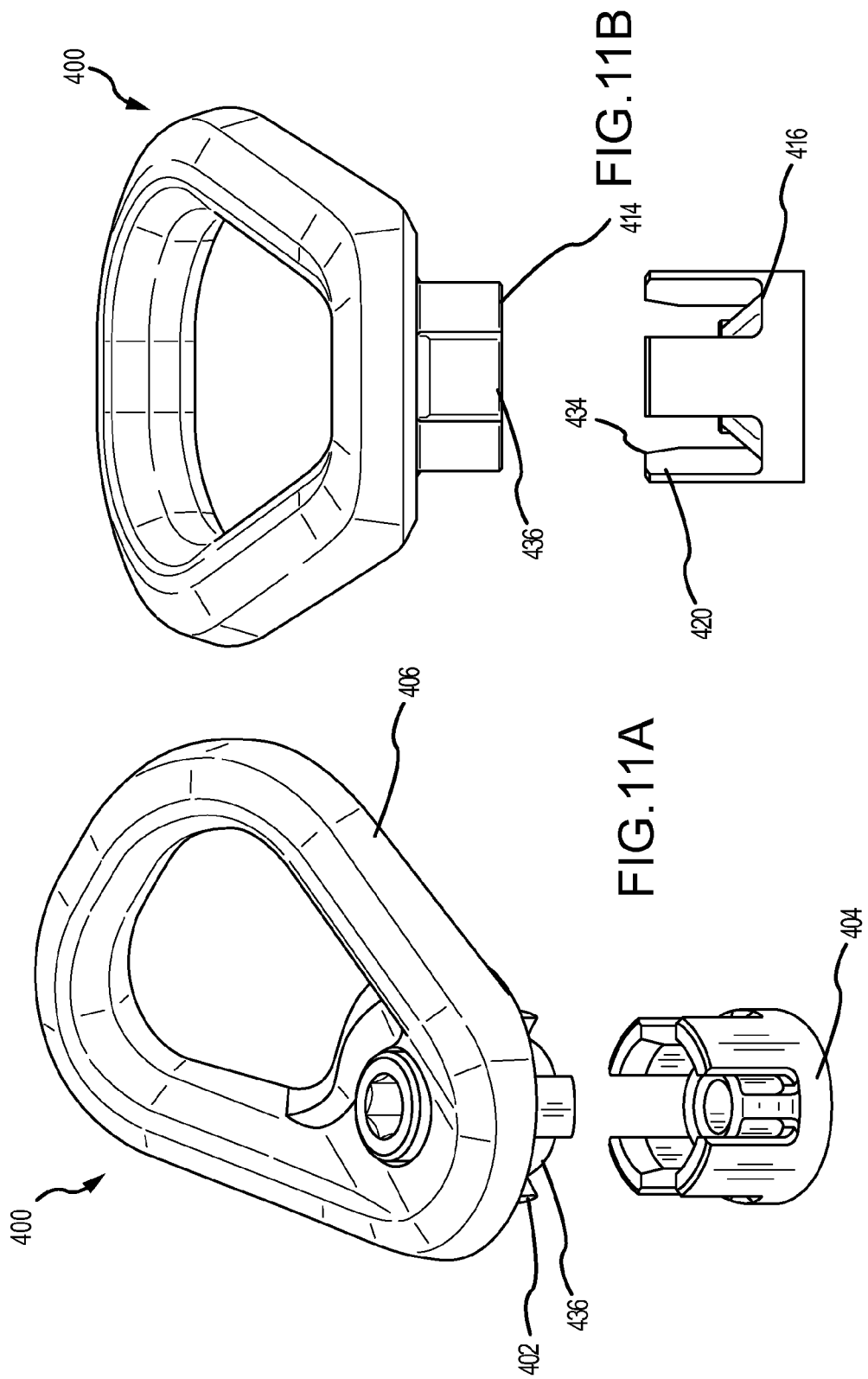

PARACLIP ADAPTER

CROSS REFERENCE TO RELATED APPLICATIONS

This application claims priority to U.S. Provisional Application No. 61/926,195, filed Jan. 10, 2014, and entitled "QUICK DETACH PARACLIP ADAPTER," the entire disclosure of which is hereby incorporated by reference for all purposes.

FIELD OF THE DISCLOSURE

The present disclosure relates generally to firearms accessories. In particular, but not by way of limitation, the present disclosure relates to systems, methods and apparatuses for quickly attaching and detaching an adapter to a firearm configured for coupling to a sling.

BACKGROUND

Slings are regularly used with firearms to allow for a convenient method of carry and for weapon retention in dynamic environments. Traditional slings mount onto the bottom of a weapon at two points, fore and aft, allowing for suitable carry over long distances and may be used as a steadying aid to improve weapon accuracy. While it offers the user the ability to carry the weapon comfortably over the shoulder or securely across the back, the traditional, bottom-mounted 2-point sling hinders weapon usage in dynamic combat environments since the weapon is stowed in a non-useable orientation. While 2-point slings may be used in combat as an accuracy aid by being wrapped around the arm or other techniques, this encumbers the user through entanglement in the sling itself and is mostly useful only for long-range engagements.

Due to these limitations, side-mounted 2-point or 3-point slings were developed to allow for improved usage as these systems allow the user to carry a weapon comfortably on the front of the body in a usable low-ready position instead of over the back or shoulder. These systems typically incorporate the ability to carry over-the-back or shoulder, like a traditional sling, since these carry positions are useful for climbing, swimming, low (belly) crawling or when maximum frontal dexterity is needed when carrying supplies or wounded. While these slings were a major improvement over the traditional sling, they primarily were intended for use from a single-side and require manual adjustment to allow for transitions from side-to-side in dynamic situations. Additionally, due to the amount of strap material used to wrap around the body, they can also interfere with chest-mounted equipment, such as on load-bearing vests. Traditionally, sling swivels have been used to secure slings to the weapon. These swivels have taken many forms but they all have similar characteristics: namely, they are rotatable (swivel) about a point and are usually an elongated loop through which sling material may be threaded. They have been positioned on either side of the weapon, so that the sling may be said to be mounted on either side, or on the upper and lower surfaces of the weapon, so that the sling may be said to be mounted along the weapon, or a combination thereof.

However, such swivel slings can encumber or entangle the user and thus require quick detachment from the firearm. The quick detach or "QD" interface was thus developed in order to enable rapid removal of a sling from a firearm. The QD interface includes a "QD socket" including a female portion of the interface and a QD body including a male portion of the interface. The QD socket (sometimes referred to as a "swivel socket") typically includes an axial cavity sometimes having an annular ring into which a portion of the QD body can selectively couple to. The QD body typically includes some type of loop or bail for either threading a sling through or for coupling to via a clip such as the snap clip illustrated in U.S. Design Pat. No. 679,580 or as described in U.S. Pat. No. 8,544,153. The QD body also typically includes a "connection post" that fits into and interfaces with the axial cavity of the QD socket. In particular, many QD bodies feature an internal spring loaded plunger that biases a plurality of ball bearings through the QD connection post. The ball bearings then interface with a ridge in a QD socket and hold the QD body in place. When desired, the user depresses the plunger and the bias on the ball bearings is removed, allowing them to roll into the casing and thereby allowing the QD body to be removed from the QD socket.

Some exemplary QD sockets include the EZ CARBINE QD SWIVEL ATTACHMENT POINT from DANIEL DEFENSE, and the RAIL MOUNT QD SLING SWIVEL from DANIEL DEFENSE, to name a few. Some exemplary QD bodies include the QUICK-DETACH SLING SWIVEL from VLTOR WEAPON SYSTEMS, the QD SLING SWIVEL from DAMAGE INDUSTRIES, the QD SWIVEL from DANIEL DEFENSE, and the HEAVY DUTY FLUSH BUTTON SWIVEL from MI, to name a few.

Popularity of the QD interface has led manufacturers to include QD sockets on many firearms and firearms accessories and has led many users to add QD sockets to their firearms. However, the QD body is often large and adds weight to a firearm. Also, the QD interface is believed by some to be vulnerable to detachment under severe static and dynamic force situations. Thus, there is a need for an adapter able to couple to a QD socket but having lighter weight, smaller size, and a more reliable and/or semi-permanent coupling mechanism than existing QD bodies.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for modifying a QD connection.

In one exemplary embodiment, the present invention can include an adapter for a QD socket. The adapter has a first post portion having a longitudinal axis, a loop, and a first contact tab shaped to interface with a QD socket, and a second post portion having a second contact tab shaped to interface with a QD socket. The second post portion is coupled to the first post portion and movable between a first configuration defining a first transverse distance between the first and second contact tabs and a second configuration defining a second transverse distance between the first and second contact tabs. The first transverse distance is greater than the second transverse distance.

Another exemplary embodiment includes a method of modifying a quick disconnect attachment. The method includes providing an adapter assembly having a plurality of contact tabs, the plurality of contact tabs movable between a first configuration having a first transverse distance between the plurality of contact tabs and a second configuration having a second transverse distance between the plurality of contact tabs, the first transverse distance greater than the second transverse distance. The method further includes loosening the adapter assembly to cause the adapter assembly to move from the first configuration to the second configuration. The method further includes inserting a distal portion of the adapter into a QD socket, and orienting a loop on the adapter assembly to a desired position. The method further includes tightening the adapter assembly to cause the adapter assembly to move from the second configuration to an engagement configuration wherein the first and second contact tabs engage the QD socket to maintain the adapter assembly attached to the QD socket in a semi-permanent manner.

Another exemplary embodiment includes an adapter for a QD socket having a connection post having a plurality of contact tabs movable relative to each other between a first configuration and a second configuration. The first configuration defines a maximum effective outer diameter of the connection post, and the second configuration defines a minimum effective outer diameter of the connection post.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 9 is an isometric view of another alternative adapter having a wedging ring;

FIG. 9A is an isometric exploded view of the alternative adapter in FIG. 9;

FIG. 9B is a rear exploded view of the alternative adapter in FIG. 9;

FIG. 10 is an isometric view of another alternative adapter having another wedging feature;

FIG. 10A is an exploded isometric view of the upper portion and lower portion of the another alternative adapter in FIG. 10;

FIG. 11A is an exploded isometric view of the upper portion and lower portion of the another alternative adapter in FIG. 11;

FIG. 11B is an exploded front view of the upper portion and lower portion of the another alternative adapter in FIG. 11;

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure relates generally to firearms accessories. In particular, but not by way of limitation, the present disclosure relates to systems, methods and apparatuses for quickly attaching and detaching an adapter to a firearm configured for coupling to a sling.

Herein disclosed is an adapter that avoids the weight and size of a traditional QD body by using a smaller and lighter fixed loop or other fixed attachment point. Overcoming the risk of a traditional QD body unintentionally detaching from a QD socket, the herein disclosed adapter includes various attachment means used to fix the adapter to a QD socket (either allowing some, minimal, or no rotation depending on the QD socket) in a semi-permanent manner. In one embodiment, a wedged design is used (see FIGS. 1-8) wherein turning of a screw that passes through the adapter changes an effective outer diameter of a connection post of the adapter by pulling an upper and lower portion of the connection post together vertically and forcing them apart laterally. In some embodiments, the effective outer diameter can be greater than an inner diameter of the QD socket.

Figure 1:
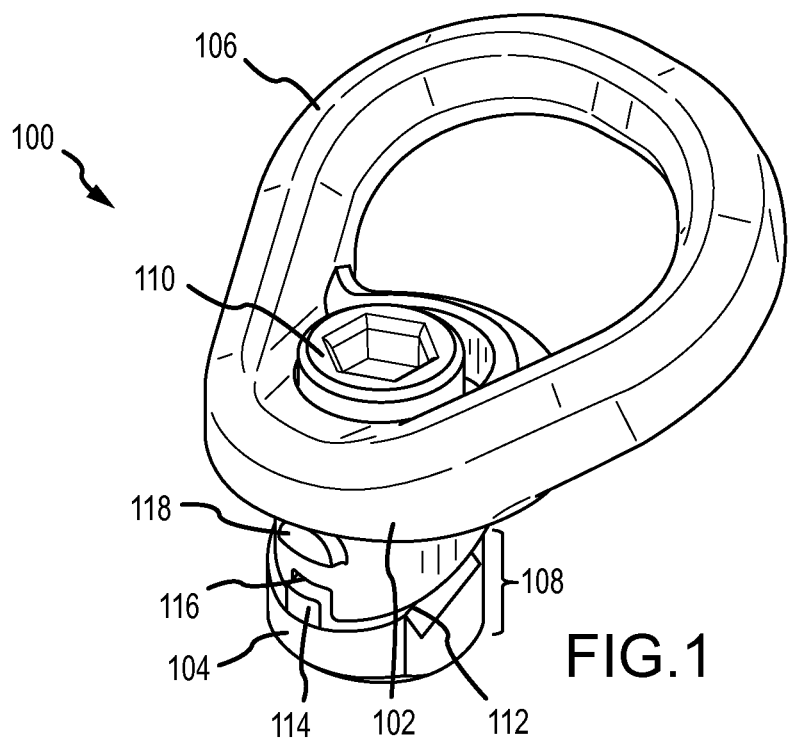
FIG. 1 is an isometric view of a wedging QD adapter.

FIG. 1 is an isometric view of a novel wedging adapter according to one embodiment of this disclosure. The illustrated wedging QD body 100 includes a loop that can be clipped into via a sling. The QD body 100 also includes a connection post 108 affixed to the connection post 108 and including an upper portion 102 of the connection post 108 and a lower portion 104 of the connection post 108. The adapter 100 can be tightened and coupled into a QD socket by tightening a screw 110 (although illustrated as a hex screw, other types of screws can also be used). The screw 110 passes generally longitudinally through an elongate slot in the upper portion 102 and screws into a threaded opening in the lower portion 104. As the screw 110 tightens, the upper portion 102 and the lower portion 104 are drawn together. However, when the two portions 102, 104 meet at an angled interface 112, continued rotation of the screw 110 continues to apply vertical force between the two portions 102, 104 causing the upper and lower portions 102, 104 to move laterally relative to each other and thereby causing an increase in an effective outer diameter of the connection post 108. In the illustrated embodiment, as the screw 110 is tightened, the upper portion 102 would move out of the page and to the left of the page while the lower portion 104 would move into the page and to the right of the page.

The direction of lateral movement can be controlled by an optional guide ridge 114 in the lower portion 104 that interfaces with an optional guide valley 116 in the upper portion 102. The optional guide ridge 114 and the optional guide valley 116 can be shaped and sized so as to fit into each other. In the illustrated embodiment, the guide ridge 114 and the guide valley 116 are arranged parallel to a plane that passes through the adapter from a front to a back and from a top to a bottom of the adapter 100. In some embodiments, the guide ridge 114 has a seat 114a that has an abutting surface perpendicular to a longitudinal axis of the connection post and a nesting seat 114b having an abutting surface parallel to the longitudinal axis. In other non-illustrated embodiments, other planes for lateral movement can be used and thereby effect different directions of lateral movement between the upper and lower portions 102, 104.

The connection post 108 includes a tab 118 on a front side (part of the upper portion 102) and a tab 120 on a back side (part of the lower portion 104). As the upper and lower portions 102, 104 move laterally relative to each other, the tabs 118, 120 move laterally apart and thus increase an effective outer diameter of the connection post 108 and hence enable the tabs 118, 120 to lock into an annular groove in a QD socket. While mere pressure from the adapter 100 on the inner diameter of a QD socket can prevent swiveling of the adapter 100, in some cases a QD socket can include a discontinuous annular groove or other openings in a side of the QD socket that the tabs 118, 120 can fit into and thereby prevent swiveling of the adapter, or at least prevent more than a set amount of swiveling.

Figure 5A:
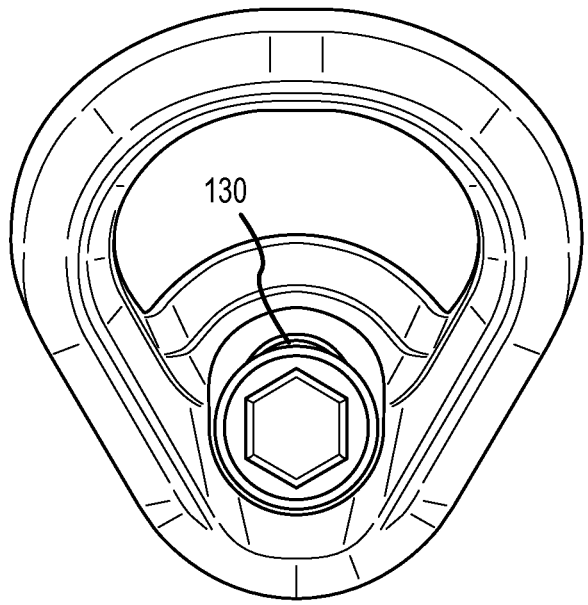
FIG. 5A is a top view of the adapter in FIG. 1.
Figure 5B:
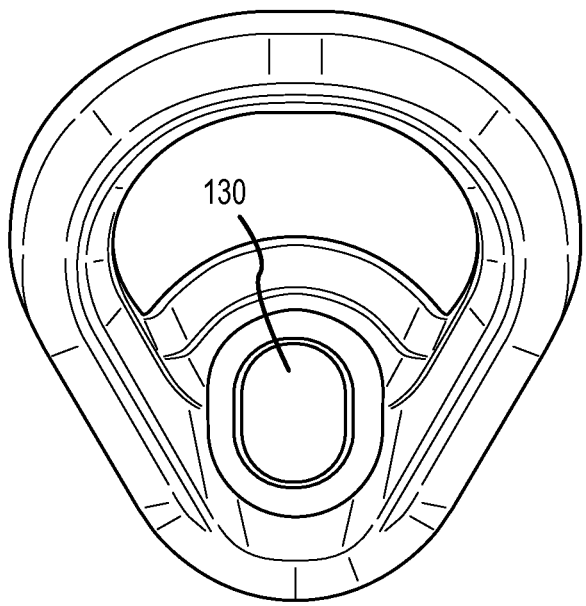
FIG. 5B is a top view of the upper portion of the adapter in FIG. 1.
Figure 7:
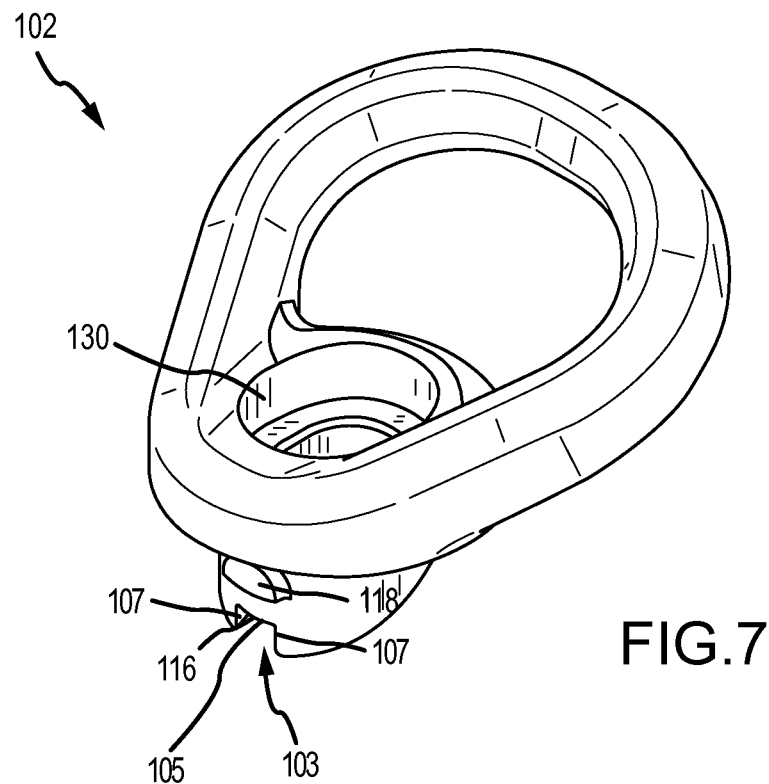
FIG. 7 is an isometric view of the upper portion of the adapter in FIG. 1.

The screw 110 passes through an elongated slot 130 in the upper portion 102 as seen in FIGS. 5B and 7. The elongated slot 130 enables the screw 110 to move laterally relative to the upper portion 102. Since the screw 110 couples to an internal threading of the lower portion 104, the screw 110 does not move laterally relative to the lower portion 104. However, as the screw 110 is tightened and loosened it moves laterally relative to the upper portion 104 and thus the elongated slot 130 allows this lateral movement. The longer dimension of the elongated slot 130 can be arranged parallel to the axis of lateral movement of the upper and lower portions 102, 104 relative to each other.

Figure 3:
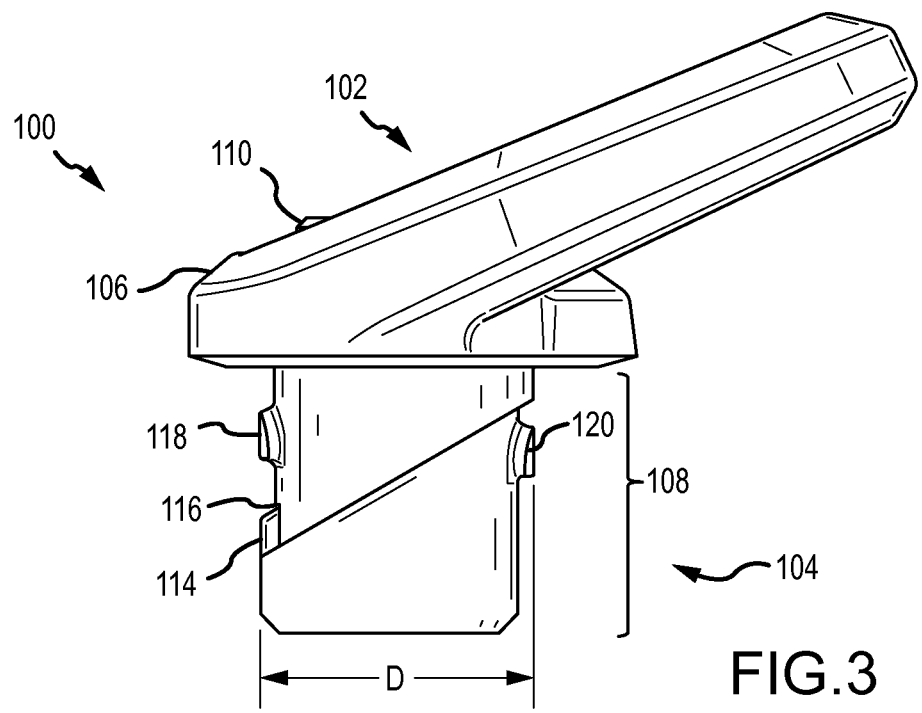
FIG. 3 is a side view of the adapter in FIG. 1.
Figure 4A:
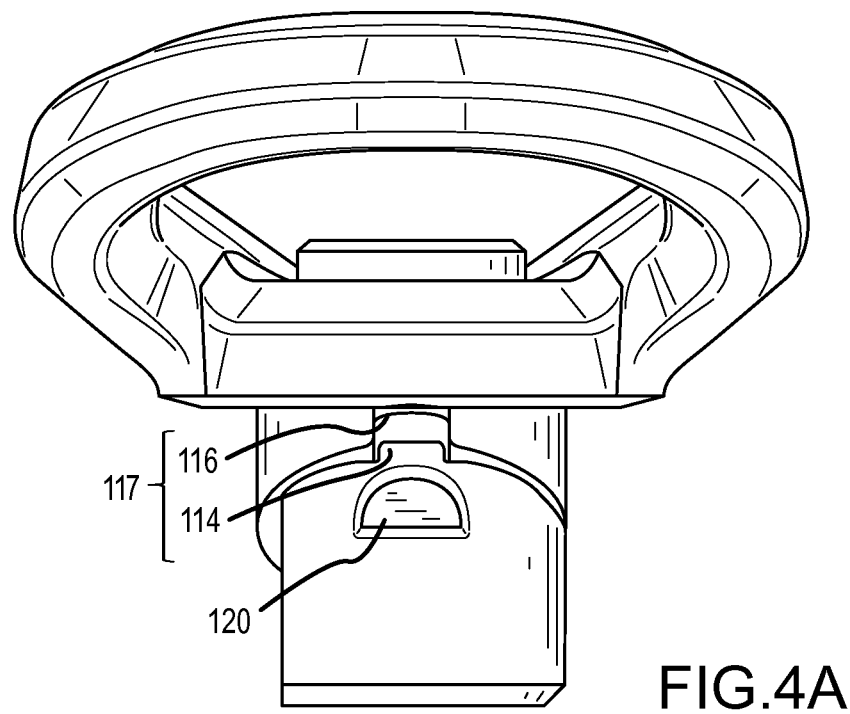
FIG. 4A is a rear view of the adapter in FIG. 1.
Figure 4B:
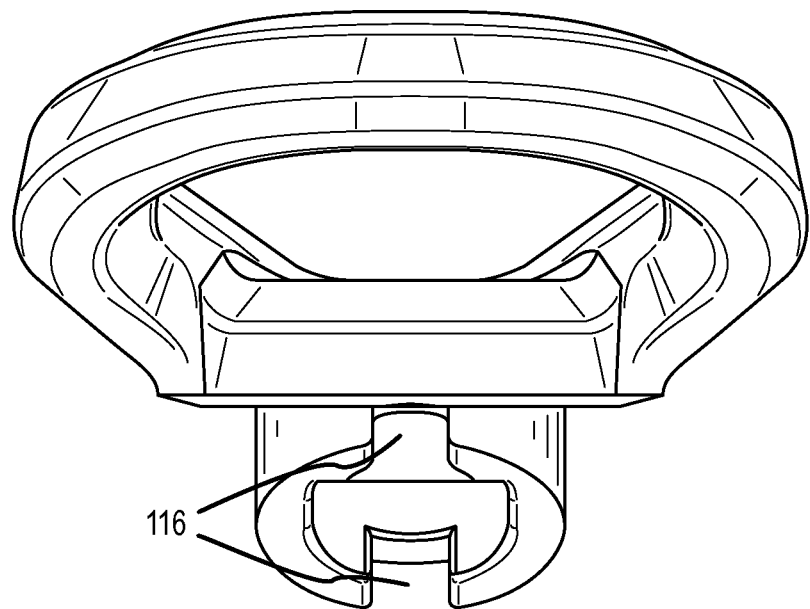
FIG. 4B is a rear view of the upper portion of the adapter in FIG. 1.
Figure 8:
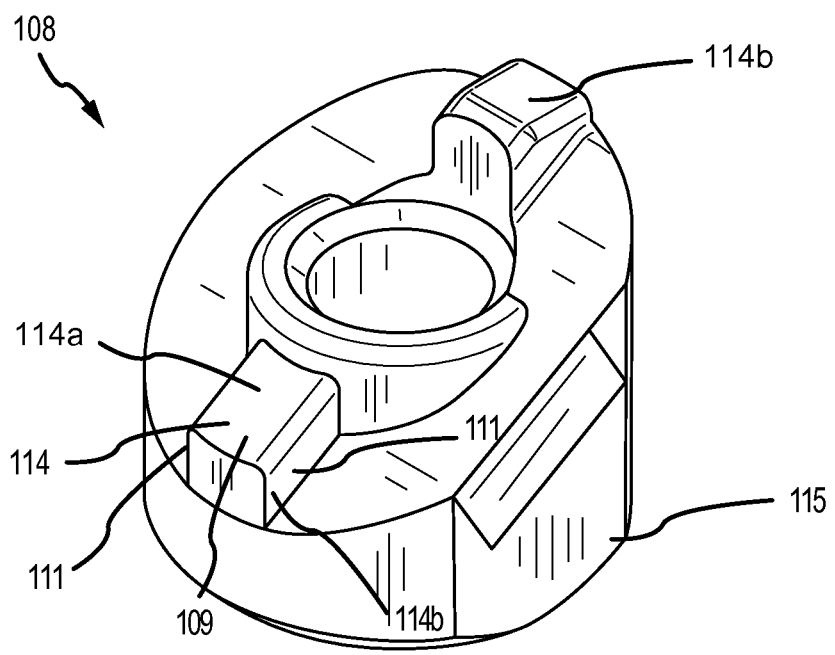
FIG. 8 is an isometric view of the lower portion of the adapter in FIG. 1.

An effective outer diameter of the adapter 100 has been discussed throughout this disclosure. The effective outer diameter is a maximum diameter of portions of the connection post 108 that interface with a QD socket as illustrated in FIG. 3. FIG. 3 shows the upper and lower portions 102, 104 when the screw 110 is relatively loose, and hence the effective outer diameter of the connection post 108 is near a minimum. As the screw 110 tightens, the lower portion 104 would move to the right and the upper portion 102 would move to the left, relative to each other on the page. As can be seen, this causes the effective outer diameter of the connection post 108 to increase and in this way a tight interface can be formed between the connection post 108 and a QD socket. The effective outer diameter D is defined by a transverse distance between the two tabs 118, 120. It should be understood that, although the tabs 118, 120 are shown opposing one another, the tabs 118, 120 need not necessarily be 180 degrees apart. FIG. 4A illustrates a back view of the adapter 100 in FIG. 3, including the tab 120 for interfacing with a QD socket, and a guide mechanism 117. The guide mechanism 117 is shown with a guide ridge 114 in the lower portion 104 interfacing with a guide valley 116 in the upper portion 102, to limit rotation of the upper portion 102 relative to the lower portion 104. FIG. 4B illustrates a back view of the upper portion 102 and guide valley 116 therein. FIGS. 7 and 8 illustrate isometric views of the features in further detail, including an optional deflashing surface 115, wherein excess material has been removed after a molding operation. Specifically, although the assembly 100 may include a deflashing surface 115, depending on the manufacturing method chosen, the surface may be absent in some embodiments.

In some embodiments, and as illustrated in FIGS. 7-8, the adapter may have a travel stop 103, 109. The travel stop 103 has a first contact surface 105 in a first post portion, which may be the upper portion 102, and the first contact surface 105 is perpendicular to the longitudinal axis of the first post portion. The travel stop 103 also has a second contact surface 107 in the first post portion that is parallel to the longitudinal axis. The first contact surface 105 defines the first configuration and the second contact surface 107 defines the second configuration.

The angled interface 112 can have an angle of approximately 30° when measured relative to a horizontal plane passing through front, rear, and sides of the adapter 100 (i.e., parallel to the page in FIG. 5A). However, other angles are also envisioned and those between 15° and 45° may be preferred where greater lateral forces and/or lateral movement of the upper and lower portions 102, 104 relative to each other are desired.

Figure 2:
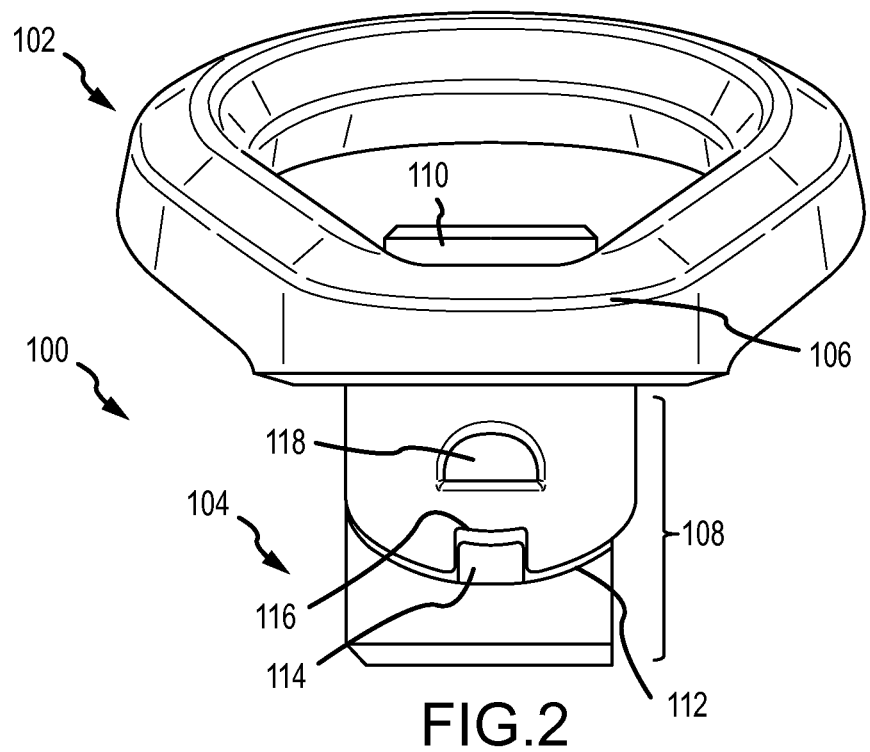
FIG. 2 is a front view of the adapter in FIG. 1.

In FIG. 2 it is seen that the tab 118 has a semi-circular profile as viewed from the front. While this can be effective for certain applications and certain QD sockets, it is not required, and other shapes and sizes of tabs 118 and 120 can be implemented. For instance, FIGS. 6B-6C illustrate some other embodiments of the tab 118. As seen, a common feature is that the tab 118 fits within an imaginary semicircle that corresponds to, or is slightly greater than an inner diameter of a QD socket (e.g., a 0.375" diameter semi-circle).

Figure 6A:
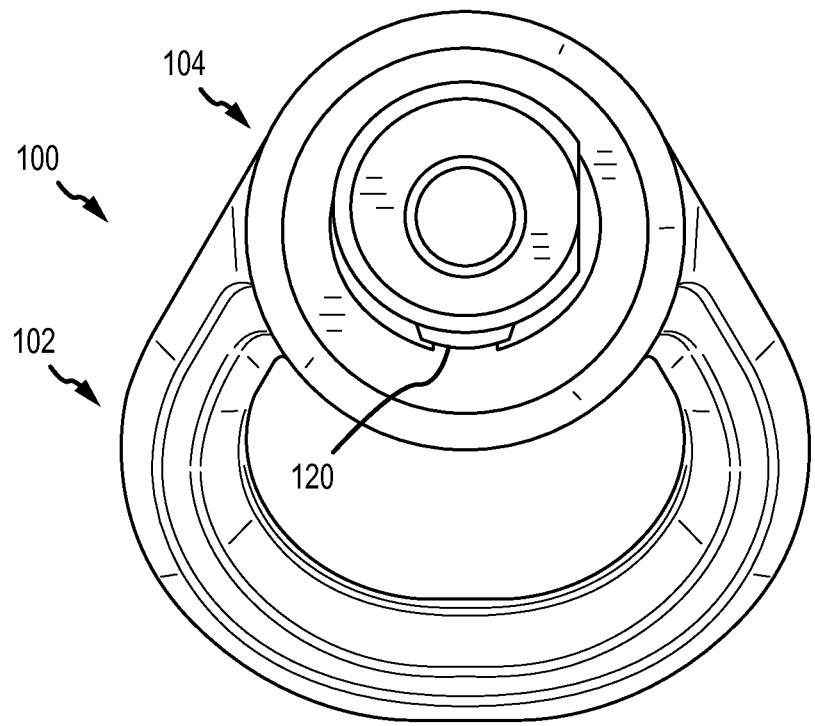
FIG. 6A is a bottom view of the adapter in FIG. 1.
Figure 6B:
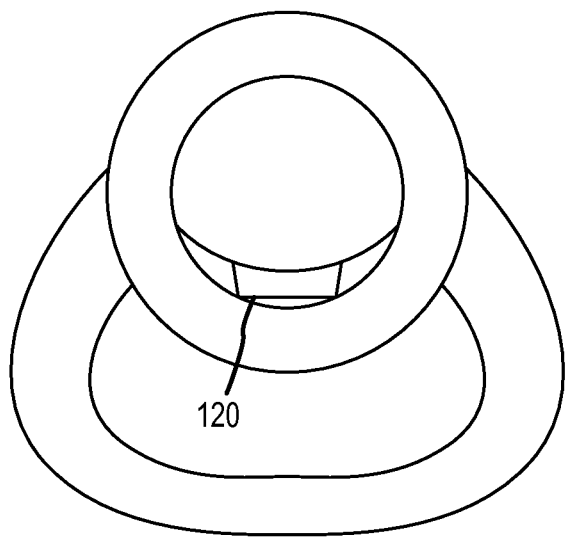
FIG. 6B is a bottom view of an alternative adapter having an alternative tab.
Figure 6C:
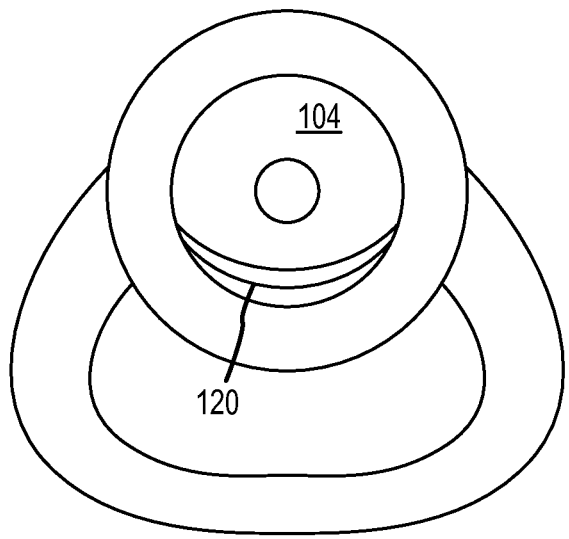
FIG. 6C is a bottom view of another alternative adapter having another alternative tab.

As seen most clearly in FIGS. 6A-6C, the lower portion 104 is not perfectly circular. In the illustrated embodiment, a front half of the lower portion 104 has a circular shape while the rear half has an elliptical or offset circular shape. It can also be seen that the tab 120 should fit into an imaginary circle that mimics the radius of the front half and then extends this radius to the back half. This radius can be equal to or wider than an inner radius of a QD socket. Additionally, FIGS. 6B-6C have been illustrated with exaggerated scales in order to more clearly show the elliptical or offset circular nature of the rear half (or rear portion) of the lower portion 104.

While a loop 106 has been illustrated and described, this attachment means is not limited to a loop or to the particular shape of a loop shown and described. Other attachment means may also be implemented without deviating from the intent and scope of this disclosure.

In some alternative embodiments, the adapter 100 can exclude one or both of the tabs 118, 120. For instance, where no tabs are implemented, the QD socket to which the adapter 100 is to be coupled may not have an annular groove for the tabs 118, 120 to engage.

While a guide ridge and valley 114, 116 have been illustrated, other alignment or guidance mechanisms can be used to ensure that the upper and lower portion 102, 104 move laterally relative to each other along a single plane.

While a screw 110 has been illustrated and described as the mechanism to apply force between the upper and lower portions 102, 104 and thereby expand or decrease the effective outer diameter of the connection post 108 interfacing with a QD socket, other means can be used such as a screw passing through slots in both the upper and lower portions 102, 104 (no threading) and a washer or nut below the lower portion 104. This is just one non-limiting example of other means that can be used to apply vertical force between the upper and lower portions 102, 104.

FIG. 6A is a bottom plan view of an alternative embodiment of a wedging adapter having an alternative shape to the tab 120 on the lower portion 104. FIG. 6B is a bottom plan view of an alternative embodiment of a wedging adapter having another alternative shape to the tab 120 on the lower portion 104. From these two examples it should be apparent that various shapes and sizes of the tab 120 can be implemented as long as the shape and size of the tab fits within a circle having an imaginary circle congruent with a front half of the lower portion 104 and having a diameter equal to or greater than an inner diameter of a QD socket to be interfaced with.

Turning now to FIGS. 9, 9A, and 9B, another embodiment of an adapter assembly 200 is now described. While the adapter assembly 200 now described has the general functionality of the embodiment shown in FIG. 1, the features and manner of operation is slightly different. Here, the assembly 200 has a screw 210 coupling a loop 206 to a lower portion 204, with an interface ring 232 therebetween. The interface ring 232 has one or more tabs 220 that may interface with a QD socket. A loop 206 may be provided as an attachment interface.

With specific reference to FIG. 9B, tightening the screw 210 causes the upper portion 202 of the assembly 200 to move closer to the lower portion 204. As the upper and lower portions 202, 204 approach one another, angled surfaces 234, 236 in the upper and lower portions 202, 204 respectively cause the interface ring 232 to expand outwardly, thereby increasing the effective overall diameter of the interface ring 232.

The interface ring 232 may be manufactured of a material that is more elastic than the upper and lower portions 202, 204.

Figure 10B:
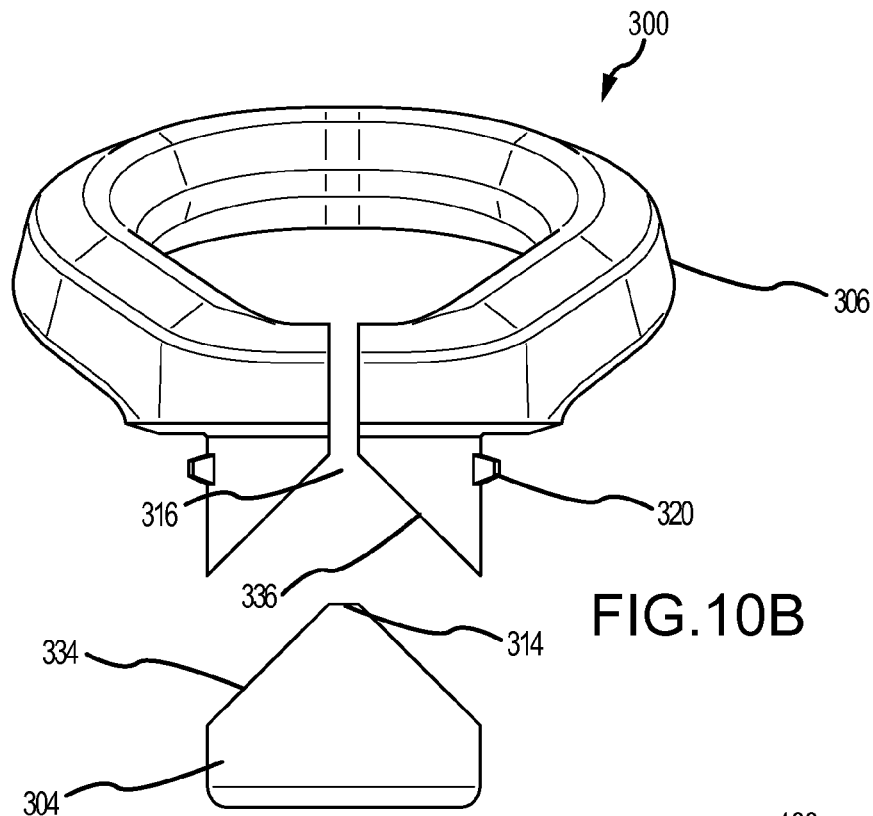
FIG. 10B is an exploded rear view of the upper portion and lower portion of the another alternative adapter in FIG. 10.

Turning now to FIGS. 10, 10A, and 10B, a third embodiment of the assembly 300 is now described. The assembly 300 is similar to assembly 200, with a loop 306, an upper portion 302, a lower portion 304, and a screw 310 attaching the upper and lower portions 302, 304. With specific reference to FIG. 10B, tightening the screw 310 (not shown in FIG. 10B to add clarity) causes the upper portion 302 to approach the lower portion 304. As the upper portion 302 approaches, one or more angled interfaces between the upper and lower portions 302, 304 causes the upper portion 302 to expand. The upper portion 302 has one or more tabs 320 that expand with the upper portion thereby increasing the overall effective diameter of the upper portion 302 to interface with a QD socket. A guide ridge 314 and a guide valley 316 may further be included, so as to limit relative rotation between the upper and lower portions 302, 304.

Although illustrated in FIGS. 10-10B as having an upper portion 302 that expands, it should be understood that the features and functionality may be reversed, such that the lower portion 304 expands as the upper and lower portions 302, 304 approach one another, to cause an effective overall diameter to be increased for interfacing with a QD socket.

Figure 11:
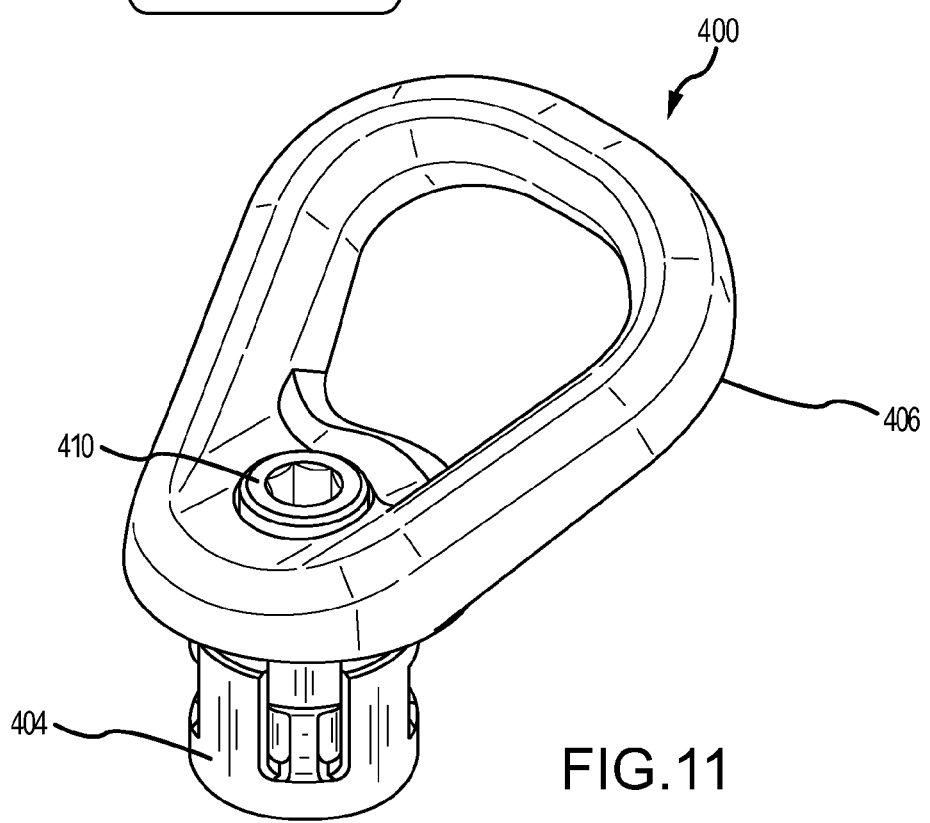
FIG. 11 is an isometric view of another alternative adapter having a wedging prong.

Turning now to FIGS. 11, 11A, and 11B, a fourth embodiment of the assembly 400 is now described. The assembly 400 has an attachment interface 406 attached to an upper portion 402 which is, in turn, coupled to a lower portion 404 using a screw 410. The lower portion 404 has one or more tabs 420 that are caused to expand as the screw 410 is tightened. One or more of the tabs 420 may have an upper region 434 for interfacing with an angled surface 436 in the upper portion 402 to aide in expansion. As the tabs 420 are expanded, they increase the overall effective diameter of the adapter 400 for interfacing with a QD socket. Specifically, the upper region 434 of the tabs 420 may interface with a lip in a QD socket. The assembly 400 may also have a guide mechanism having a guide ridge 414 and a guide valley 416 in the upper and lower portions 402, 404 respectively, so as to prevent rotation of the upper portion 402 relative to the lower portion 404.

Figure 12:
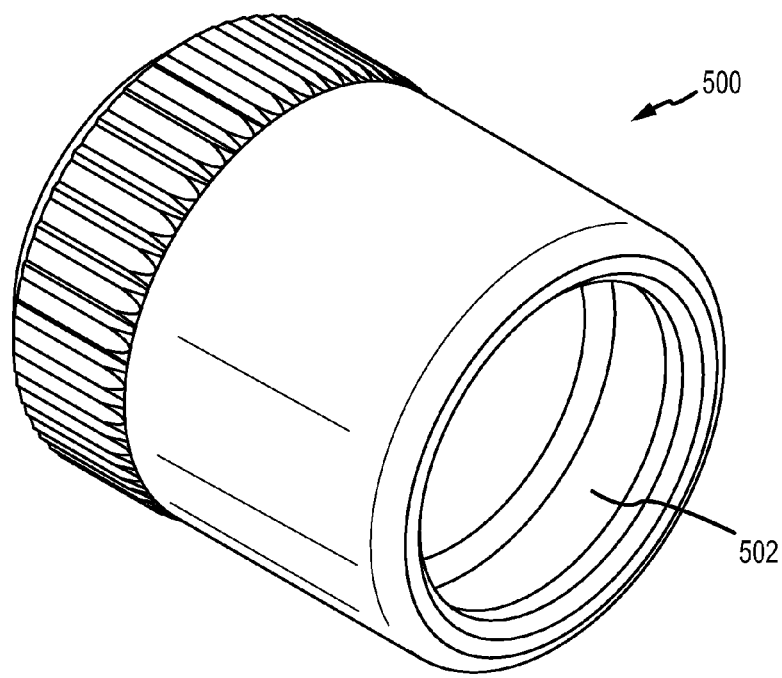
FIG. 12 is an isometric view of an exemplary QD socket used with an embodiment of the adapter.

With brief reference now to FIG. 12, one embodiment of a typical QD socket 500 is shown. The QD socket 500 generally has an interior groove 502 into which tabs, such as tabs 118, 120, 220, 320, 420 may expand or move, so as to engage the QD socket 500 in a semi-permanent manner, that is, until the assembly 100, 200, 300, 400 is loosened and removed manually.

Figure 13:
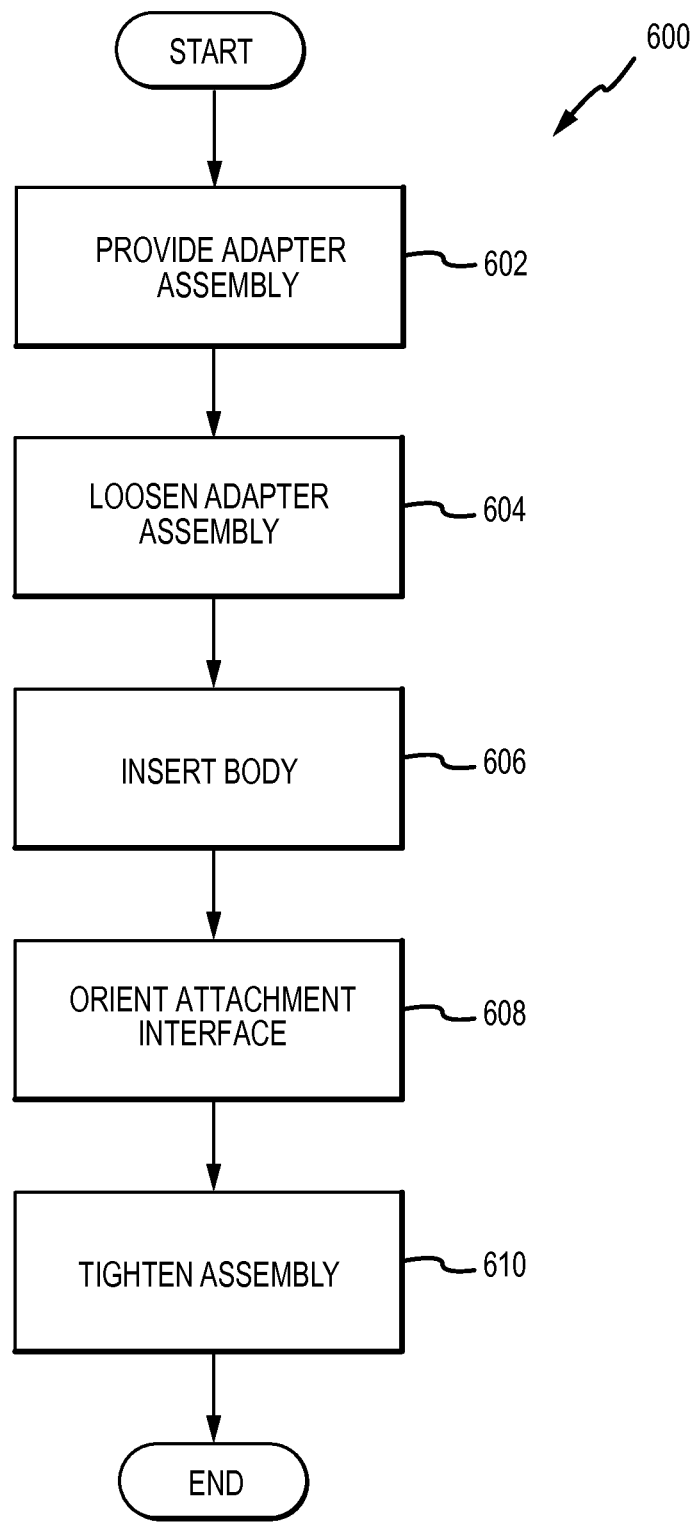
FIG. 13 is a flowchart of one embodiment of a method.

Turning now to FIG. 13, a method 600 of modifying a quick disconnect interface into a semi-permanent attachment point is now described. The method 600 comprises providing 602 an adapter assembly having a plurality of tabs, the plurality of tabs movable between a first configuration having a first transverse distance between the plurality of tabs and a second configuration having a second transverse distance between the plurality of tabs, the first transverse distance greater than the second transverse distance.

The method 600 further includes loosening 604 the adapter assembly to allow the adapter assembly to move from the first configuration to the second configuration.

The method 600 further includes inserting 606 a distal portion of the adapter into a quick disconnect (QD) socket.

The method 600 further includes orienting 608 an accessory attachment interface on the adapter assembly to a desired position. In some embodiments, the accessory attachment interface is a loop.

The method 600 further includes tightening 610 the adapter assembly to cause the adapter assembly to move from the second configuration to an engagement configuration wherein the first and second tabs engage the QD socket to selectively couple the adapter assembly to the QD socket.

The method 600 may include limiting rotation of a second post portion of the adapter assembly relative to a first post portion of the adapter assembly and/or limiting the second post portion to travel between the first configuration and the second configuration.

The method 600 may include causing a first seat in the first post portion to contact a perpendicular contact surface in the first configuration, and causing a second seat in the first post portion to contact a parallel contact surface in the second configuration. The method 600 may include causing a first contact surface in the first post portion to contact a first contact surface in the second post portion in the first configuration, the first contact surface in the second post portion perpendicular to a longitudinal axis of the second post portion. The method 600 may also include causing a second contact surface in the first post portion to contact a second contact surface in the second post portion in the second configuration, the second contact surface in the second post portion parallel to the longitudinal axis of the second post portion. See, for example, the first contact surface 105 in FIG. 7, the first contact surface 109 in FIG. 8, the second contact surfaces(s) 107 in FIG. 7, and the second contact surface(s) 111 in FIG. 8.

The method 600 may include adjusting a fastener to cause the adapter assembly to move between the first configuration and the second configuration and/or causing the plurality of tabs to interface with one of a continuous annular groove in a QD socket, a discontinuous annular groove in a QD socket, and a plurality of openings in a QD socket.

In some embodiments, loosening 604 includes causing transverse movement of a first portion of the adapter assembly relative to a second portion of the adapter assembly, thereby narrowing an effective outer diameter of the distal portion of the adapter assembly, and tightening 610 includes causing transverse movement of the first portion relative to the second portion, thereby widening an effective outer diameter of the distal portion of the adapter assembly.

The method 600 may be practiced using one or more of the adapter assemblies 100, 200, 300, 400 described with reference to FIGS. 1-12.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An adapter for a QD socket, the QD socket having a cylindrical interior space and an interior groove or plurality of openings, comprising:
    a first post portion having a longitudinal axis, a loop, and a first tab shaped to engage the interior groove or one of the plurality of openings in the QD socket;
    a second post portion having a second tab shaped to engage the interior groove or one of the plurality of openings in the QD socket; and
    a threaded fastener having a longitudinal axis and passing through the first post portion and threaded to the second post portion to couple the second post portion to the first post portion; wherein
    adjustment of the threaded fastener causes the adapter to move between a first configuration defining a first transverse distance between the first and second tabs and a second configuration defining a second transverse distance between the first and second tabs, the first transverse distance greater than the second transverse distance; and wherein
    an upper region of the first tab and an upper region of the second tab are in a plane orthogonal to the longitudinal axis of the threaded fastener when in the first configuration.

2. The adapter of claim 1, further comprising:
    a guide mechanism shaped to limit rotation of the second post portion relative to the first post portion, the guide mechanism having a guide ridge interfacing with a guide valley; wherein
    the guide ridge is in the second post portion and the guide valley is in the first post portion.

3. The adapter of claim 2, wherein:
    the guide mechanism further comprises a travel stop shaped to limit the second post portion to travel between the first configuration and the second configuration.

4. The adapter of claim 3, wherein:
    the travel stop comprises a first contact surface in the first post portion, the first contact surface perpendicular to the longitudinal axis of the first post portion; and
    the travel stop comprises a second contact surface in the first post portion, the second contact surface parallel to the longitudinal axis; and further wherein
    the first contact surface defines the first configuration and the second contact surface defines the second configuration.

5. The adapter of claim 1, wherein:
    the second post portion abuts the first post portion at an angle relative to the longitudinal axis of the first post portion, the angle between 15 degrees and 45 degrees; and
    a fastener couples the first and second post portions, wherein adjustment of the fastener causes the first and second post portions to slide relative to each other.

6. The adapter of claim 1, further comprising:
    a through passage in the first post portion, the through passage shaped to allow a fastener to pass therethrough and to allow the fastener to translate transversely relative to the longitudinal axis; and
    a fastener engagement in the second post portion, the fastener engagement shaped to allow the second post portion to translate longitudinally relative to the fastener.

7. The adapter of claim 1, wherein:
    the second post portion is shaped to pass into a minimum diameter of a QD socket when the adapter is in the second configuration.

8. The adapter of claim 1, wherein
    the first and second tabs are shaped to engage one of a continuous annular groove in the QD socket, a discontinuous annular groove in the QD socket, or a plurality of openings in the QD socket.

9. A method of modifying a quick disconnect interface into a semi-permanent attachment point, comprising:
    providing an adapter assembly having a plurality of tabs, the plurality of tabs movable between a first configuration having a first transverse distance between the plurality of tabs and a second configuration having a second transverse distance between the plurality of tabs, the first transverse distance greater than the second transverse distance;
    loosening the adapter assembly to allow the adapter assembly to move from the first configuration to the second configuration;
    inserting a distal portion of the adapter into a quick disconnect (QD) socket;
    orienting an accessory attachment interface on the adapter assembly to a desired position; and
    tightening the adapter assembly to cause the adapter assembly to move from the second configuration to an engagement configuration wherein the first and second tabs substantially oppose one another and engage an interior groove or a plurality of openings in the QD socket to selectively couple the adapter assembly to the QD socket.

10. The method of claim 9, further comprising:
    limiting rotation of a second post portion of the adapter assembly relative to a first post portion of the adapter assembly.

11. The method of claim 10, further comprising:
    limiting the second post portion to linear travel between the first configuration and the second configuration.

12. The method of claim 10, further comprising:
    causing a first contact surface in the first post portion to contact a first contact surface in the second post portion in the first configuration, the first contact surface in the second post portion perpendicular to a longitudinal axis of the second post portion; and
    causing a second contact surface in the first post portion to contact a second contact surface in the second post portion in the second configuration, the second contact surface in the second post portion parallel to the longitudinal axis of the second post portion.

13. The method of claim 9, further comprising:
    adjusting a fastener to cause the adapter assembly to move between the first configuration and the second configuration.

14. The method of claim 9, further comprising:
    causing the plurality of tabs to engage one of a continuous annular groove in the QD socket, a discontinuous annular groove in the QD socket, or a plurality of openings in the QD socket.

15. The method of claim 9, wherein:
    the accessory attachment interface is a loop.

16. The method of claim 9, wherein:
loosening comprises causing transverse movement of a first portion of the adapter assembly relative to a second portion of the adapter assembly, thereby narrowing an effective outer diameter of the distal portion of the adapter assembly; and
tightening comprises causing transverse movement of the first portion relative to the second portion, thereby widening an effective outer diameter of the distal portion of the adapter assembly.

17. An adapter for a quick disconnect (QD) socket, comprising:
a connection post having an attachment interface and a plurality of tabs movable relative to each other between a first configuration and a second configuration, the first configuration defining a maximum effective outer diameter of the connection post, and the second configuration defining a minimum effective outer diameter of the connection post; wherein
the plurality of tabs are at a first distance from a top of the connection post in the first configuration, and at least one of the plurality of tabs is offset from the first distance in the second configuration; and wherein
the plurality of tabs are shaped and positioned to engage an interior groove or a plurality of openings in the QD socket when in the first configuration.

18. The adapter of claim 17, further comprising:
a guide mechanism shaped to limit rotation of the plurality of tabs relative to one another.

19. The adapter of claim 18, wherein:
the guide mechanism comprises a travel stop shaped to limit the adapter to movement between the first configuration and the second configuration.

20. The adapter of claim 19, wherein:
the travel stop comprises a first contact surface perpendicular to a longitudinal axis of the connection post and a second contact surface parallel to the longitudinal axis; and further wherein
the first contact surface defines the first configuration and the second contact surface defines the second configuration.

21. The adapter of claim 17, wherein:
at least one of the plurality of tabs is translatable at an angle relative to another of the plurality of tabs at an angle, the angle between 15 degrees and 45 degrees.

22. The adapter of claim 17, further comprising:
a fastener engagement in the connection post, the fastener engagement shaped to allow adjustment of the fastener to move the plurality of tabs between the first configuration and the second configuration.

\* \* \* \* \*